US012619100B2

(12) United States Patent
    Nicolis

(10) Patent No.: US 12,619,100 B2
(45) Date of Patent: May 5, 2026

(54) EYEGLASSES WITH SIMPLIFIED HINGE

(71) Applicant: LUXOTTICA S.R.L., Agordo (IT)

(72) Inventor: Diego Nicolis, Grezzana (IT)

(73) Assignee: LUXOTTICA S.R.L., Agordo (IT)

( * ) Notice: Subject to any disclaimer, the term of this patent is extended or adjusted under 35 U.S.C. 154(b) by 801 days.

(21) Appl. No.: 17/627,994

(22) PCT Filed: Jul. 15, 2020

(86) PCT No.: PCT/IB2020/056646
§ 371 (c)(1),
(2) Date: Jan. 18, 2022

(87) PCT Pub. No.: WO2021/009690
PCT Pub. Date: Jan. 21, 2021

(65) Prior Publication Data
US 2022/0260851 A1      Aug. 18, 2022

(30) Foreign Application Priority Data

Jul. 18, 2019      (IT) ........................ 102019000012243

(51) Int. Cl.
*G02C 5/22*      (2006.01)
*G02C 1/02*      (2006.01)
*G02C 5/14*      (2006.01)

(52) U.S. Cl.
CPC ............. *G02C 5/2209* (2013.01); *G02C 1/02* (2013.01); *G02C 5/146* (2013.01); *G02C 2200/06* (2013.01)

(58) Field of Classification Search
USPC ......................................................... 351/153
See application file for complete search history.

(56) References Cited

U.S. PATENT DOCUMENTS 1,970,196 A * 8/1934 Rodemeyer ............... E05F 5/08
                                                                16/257
2,671,379 A * 3/1954 Eloranta ................... G02C 5/22
                                                                351/111

(Continued)

FOREIGN PATENT DOCUMENTS

CN      103109227 A      5/2013
CN      103975269 A      8/2014

(Continued)

OTHER PUBLICATIONS

Chinese Office Action for Chinese Application No. 202080048864.4, dated Dec. 4, 2023, 9 pages with translation.

(Continued)

*Primary Examiner* — Darryl J Collins
(74) *Attorney, Agent, or Firm* — CANTOR COLBURN LLP

(57)      ABSTRACT

Eyeglasses with simplified hinge include a pair of lenses, a pair of temples and a hinge for connection between each one of the temples and the lenses. The hinge includes an element for connecting the lens and the temple, adapted to be connected to the lens at one end and provided, at an opposite end, with a portion adapted to engage a retention and locking element. The temple is provided with a cavity adapted to accommodate and lock the retention and locking element, the retention and locking element acting as a rotation fulcrum for the temple with respect to the connecting element.

7 Claims, 6 Drawing Sheets

(56) References Cited

U.S. PATENT DOCUMENTS

| | | | |
|---|---|---|---|
| 4,896,955 | A | 1/1990 | Zider et al. |
| 5,596,789 | A * | 1/1997 | Simioni ............... G02C 5/2209 403/135 |
| 5,894,336 | A * | 4/1999 | Baldissarutti ........ G02C 5/2254 351/153 |
| 5,980,039 | A * | 11/1999 | Schmid .................... G02C 5/10 351/153 |
| 6,357,874 | B1 * | 3/2002 | Miyazawa ............. G02C 5/008 351/110 |
| 6,711,779 | B1 | 3/2004 | Fuchs et al. |
| 6,826,801 | B1 * | 12/2004 | Fuchs .................. G02C 5/2209 16/228 |
| 7,048,373 | B2 | 5/2006 | Yamaguchi et al. |
| 7,338,157 | B1 * | 3/2008 | Leung .................. G02C 5/2209 351/153 |
| 2002/0054272 | A1 * | 5/2002 | Ebata .................... G02C 5/2209 351/111 |
| 2005/0243271 | A1 * | 11/2005 | Oura ..................... G02C 5/2263 351/153 |
| 2005/0275793 | A1 | 12/2005 | Yamaguchi et al. |
| 2006/0243286 | A1 * | 11/2006 | Durette ..................... A61F 9/04 128/858 |
| 2012/0327360 | A1 | 12/2012 | Lin |
| 2016/0033790 | A1 | 2/2016 | Young |

FOREIGN PATENT DOCUMENTS

| | | | | |
|---|---|---|---|---|
| FR | 2769996 | A1 * | 4/1999 | ............... G02C 5/22 |
| JP | 2014121706 | A | 7/2014 | |

OTHER PUBLICATIONS

Chinese Office Action for Chinese Application No. 202080048864. 4, dated Feb. 7, 2024, 7 pages with translation.

European Office Action for Application No. 20751290.6, dated Mar. 4, 2024, 5 pages.

Japanese Office Action for Application No. 2022-502921, dated Mar. 1, 2024, 5 pages, English translation.

International Search Report issued Oct. 14, 2020 re: Application No. PCT/IB2020/056646, pp. 1-4, citing: US 2012/0327360 A1, U.S. Pat. No. 7,338,57 B1, U.S. Pat. No. 4,896,955 A, U.S. Pat. No. 6,711,779 B1 and US 2005/0275793 A1.

T Search Report issued Mar. 13, 2020 re: Application No. 201900012243, pp. 1-8, citing: US 2012/0327360 A1, U.S. Pat. No. 7,338,157 B1, U.S. Pat. No. 4,896,955 A, U.S. Pat. No. 6,711,779 B1 and US 2005/0275793 A1.

Written Opinion issued Oct. 14, 2020 re: Application No. PCT/ IB2020/056646, pp. 1-7, citing: U.S. Pat. No. 7,338,157 B1, U.S. Pat. No. 4,896,955 A, U.S. Pat. No. 6,711,779 B1 and US 2005/ 0275793 A1.

Japanese Office Action for Application No. 2022-502921, dated Jul. 30, 2024, 6 pages with translation.

* cited by examiner

EYEGLASSES WITH SIMPLIFIED HINGE

TECHNICAL FIELD

The present disclosure relates to eyeglasses with simplified hinge. More particularly, the disclosure relates to eyeglasses provided with a hinge that allows to connect the temple to the eyeglasses in a simplified manner.

BACKGROUND

As is known, the connection between a temple and the eyeglasses, or rather the front of the eyeglasses, occurs by means of a hinge which connects the front of the eyeglasses to one end of the temple. The coupling between the front and the temple by means of the hinge must be provided by using small screws that allow this connection.

The use of screws generally is a problem if the user must assemble the temple, since it is often necessary to resort to a specialized optician.

In any case, the connection between the temple and the front of the eyeglasses can be delicate owing to the fact that the hinge is an extremely small component and is often subjected to intense stresses due to repeated openings and closings of the hinge and an excessive opening of the temple with respect to the front of the eyeglasses.

SUMMARY

The aim of the present disclosure is to provide eyeglasses in which the hinge for connection between the lens, which constitutes the front of the eyeglasses together with the bridge, and the temple of the eyeglasses is provided in such a manner as to not require the use of components, such as screws, rivets, bushings, etc., for coupling between the temple and the front.

Within this aim, the present disclosure provides eyeglasses having a hinge that is extremely tough and therefore allows the coupling between the temple and the lens of the eyeglasses to be subjected to abuse without risking failure.

The present disclosure also provides eyeglasses in which the hinge for connection between the front and the temple of the eyeglasses is provided so as to not require the use of welding spots or adhesive bonding spots.

The present disclosure further provides eyeglasses in which the temple can be coupled to the front of the eyeglasses with a hinge by means of a process that is simple and quick and does not extend the production times.

The present disclosure provides eyeglasses in which the hinge for connection between the temple and the front has a minimal impact on the aesthetics of the eyeglasses as a whole.

The present disclosure also provides eyeglasses in which the hinge for connection between the temple and the front harmonizes with the aesthetics of the front and can optionally constitute an aesthetic enhancement thereof.

The present disclosure further provides eyeglasses that are that highly reliable, relatively simple to provide and at competitive costs.

This aim, as well as these and other advantages which will become better apparent hereinafter, are achieved by providing eyeglasses with simplified hinge, comprising a pair of lenses, a pair of temples and a hinge for connection between each one of said temples and said lenses, characterized in that said hinge comprises an element connecting the lens and the temple, adapted to be connected to the lens at one end and provided, at the opposite end, with a portion adapted to engage a retention and locking element, said temple being provided with a cavity adapted to accommodate and lock said retention and locking element, said retention and locking element acting as a rotation fulcrum for said temple with respect to said connection element.

BRIEF DESCRIPTION OF THE DRAWINGS

Further characteristics and advantages of the disclosure will become better apparent from the description of preferred but not exclusive embodiments of the eyeglasses according to the disclosure, illustrated by way of non-limiting example in the accompanying drawings, wherein:

Figures 12, 13:
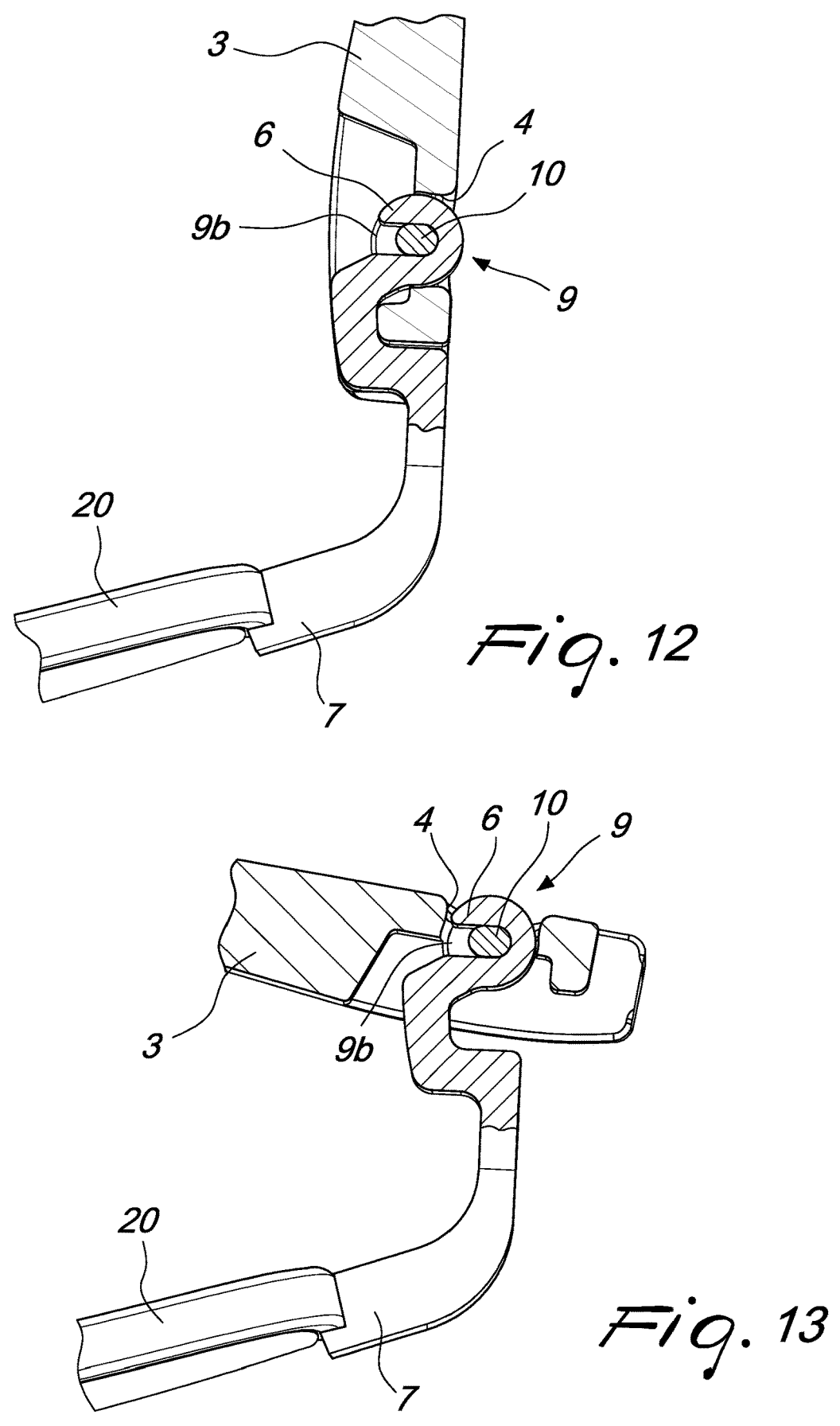

FIG. 12 is a sectional view of a first step of the coupling between the temple and the lens of the eyeglasses according to the further embodiment; and FIG. 13 is a sectional view of another of a further step of the coupling between the temple and the lens of the eyeglasses according to the further embodiment.

DETAILED DESCRIPTION OF THE DRAWINGS

Figures 1, 2, 3:
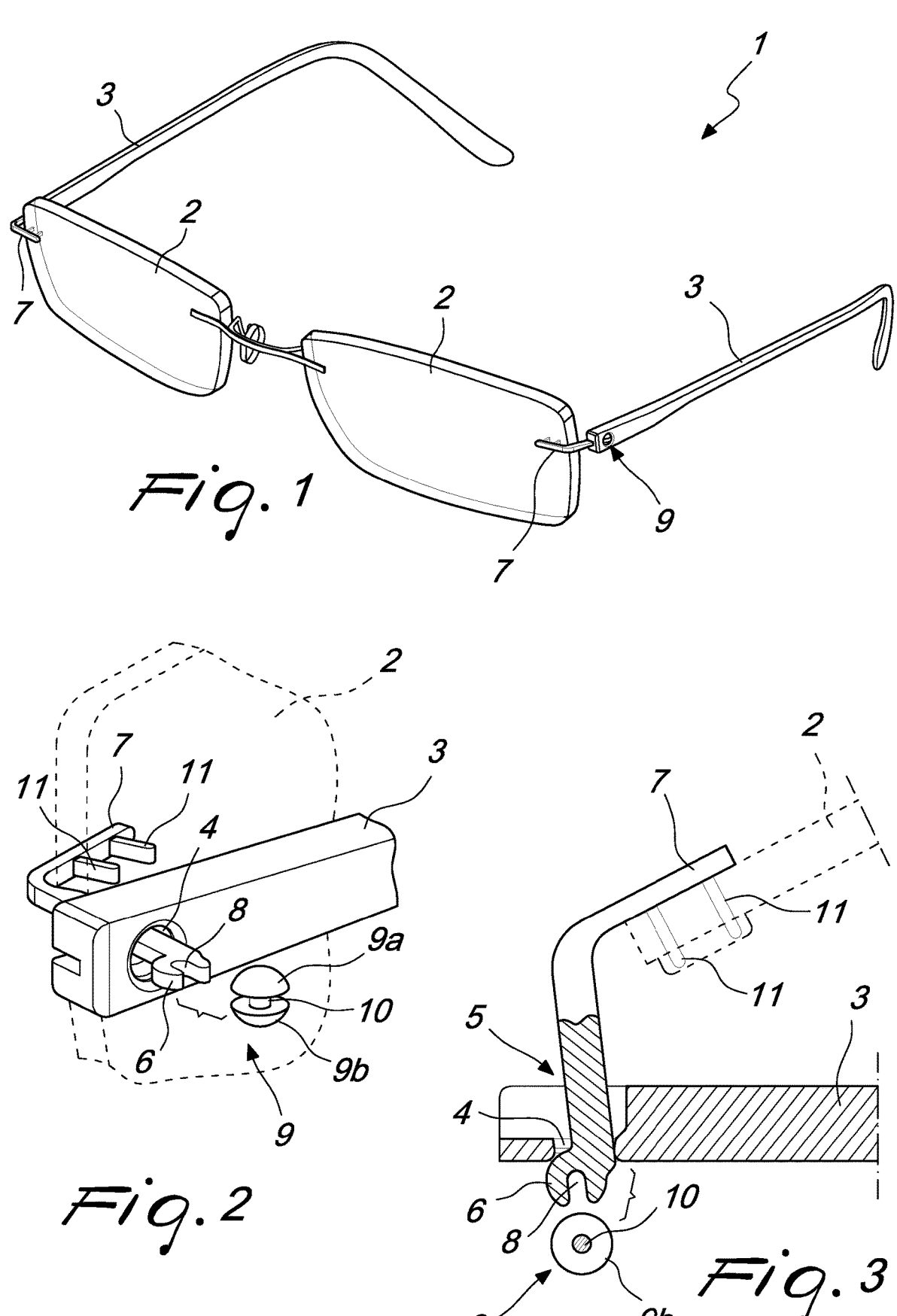
FIG. 1 is a perspective view of the eyeglasses according to the present disclosure.
FIG. 2 is a partial exploded perspective view of a detail of the connection between the temple, the hinge and the lens of the eyeglasses according to the disclosure.
FIG. 3 is a partially sectional view of the detail of the connection between the temple and the lens of the eyeglasses of FIG. 2.

With reference to the figures, in which identical reference numerals designate identical elements, the eyeglasses according to the disclosure, generally designated by the reference numeral 1, comprise, in a first embodiment thereof, a pair of lenses 2 adapted to be coupled to respective temples 3.

The coupling between the lenses 2 and the temples 3 occurs by virtue of the presence, in each of the rods 3, of a cavity or through seat 4, which is adapted to couple to a hinge.

Conveniently, the hinge, designated by the reference numeral 5, comprises an element 7 for connecting the lens 2 and the temple 3, which is for example substantially L-shaped and has, at one end, a portion 6 adapted to engage a retention and locking element 9.

Conveniently, the portion 6 is hook-shaped.

Furthermore, the hook-shaped portion 6 is contoured so as to have a cavity with parallel faces 8.

The opposite end of the L-shaped connecting element 7 is instead provided with at least one pair of pivots 11 which allow coupling to the lens 2.

Conveniently, the retention and locking element 9 is for example substantially spherical and is composed of two hemispheres 9a and 9b, which are mutually coupled by a pivot 10. The pivot 10 is adapted to engage the cavity 8 of the L-shaped element 7 and in particular its hook-shaped portion 6.

The substantially spherical element 9 is adapted to be accommodated within the cavity 4.

The cavity 4 is shaped so as to have an opening size D1 that is smaller than the diameter D2 of the substantially spherical element 9, so that the coupling of the element 9 within the cavity 4 occurs by interference.

FIGS. 2 to 7 show the method of use of the temple 3 with respect to the lens 2 of the eyeglasses.

Figure 4:
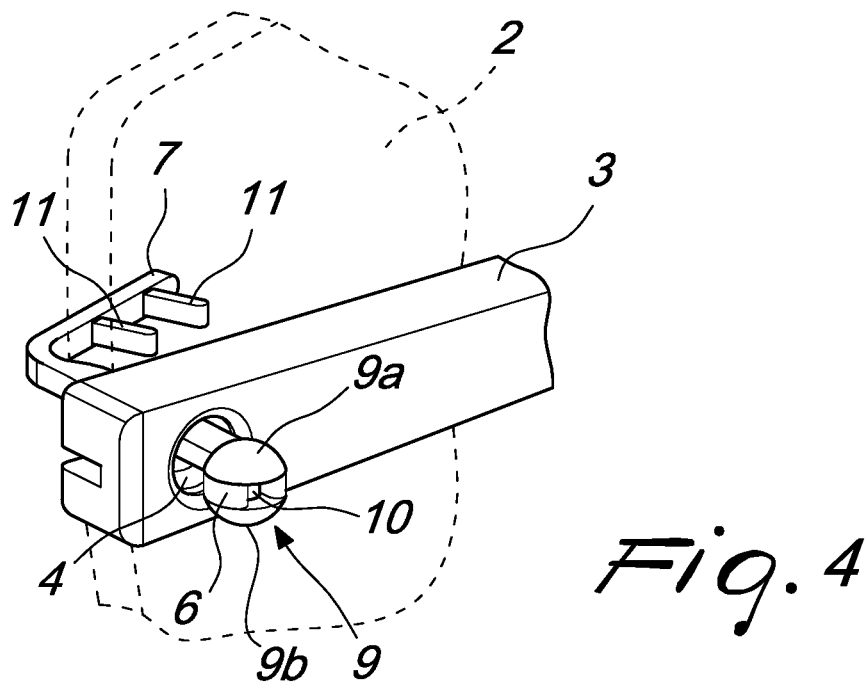
FIG. 4 is a partial perspective view of a second step of the coupling between the temple and the lens of the eyeglasses, which follows the step shown in FIGS. 2 and 3.

FIGS. 2 and 3 show that the L-shaped connecting element 7 is inserted in the cavity 4 to protrude from the opposite side externally with respect to the temple 3. At this point, the substantially spherical element 9 is inserted in the hook-shaped portion 6; in particular, the pivot 10 of the substantially spherical element 9 is accommodated in the cavity 8 of the hook-shaped portion 6, as shown in FIGS. 4 and 5.

Figure 5:
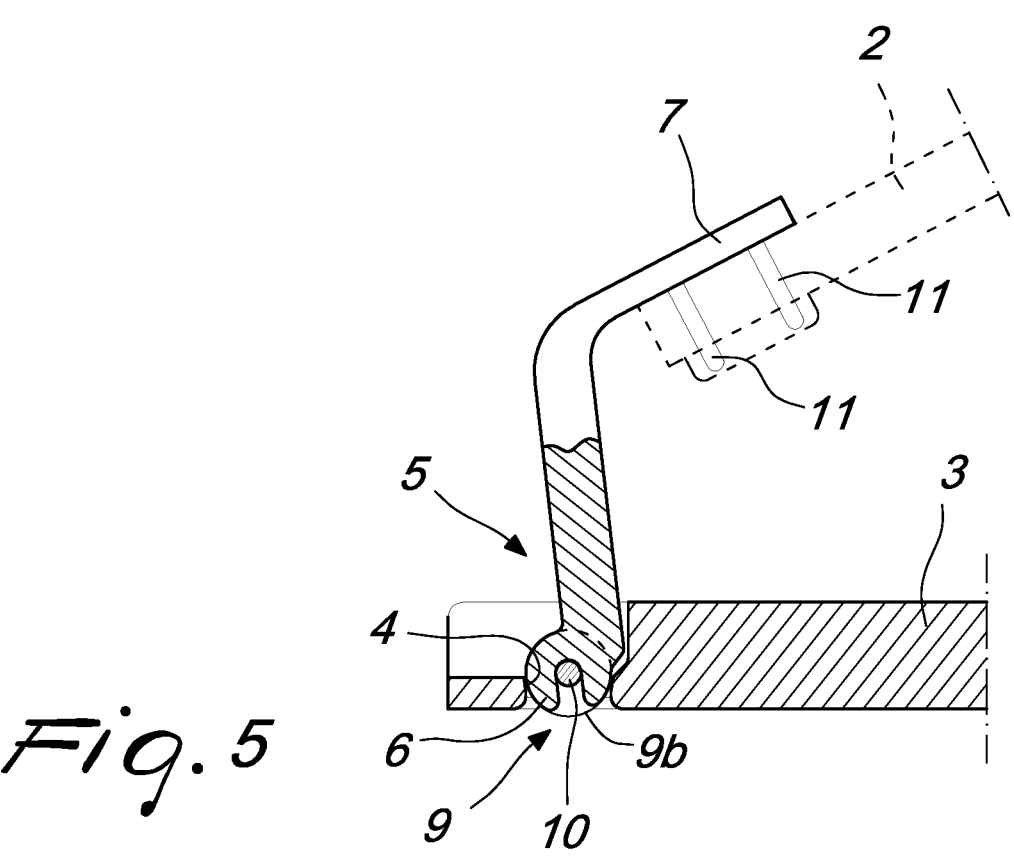
FIG. 5 is a partially sectional view of the coupling of FIG. 4.
Figure 6:
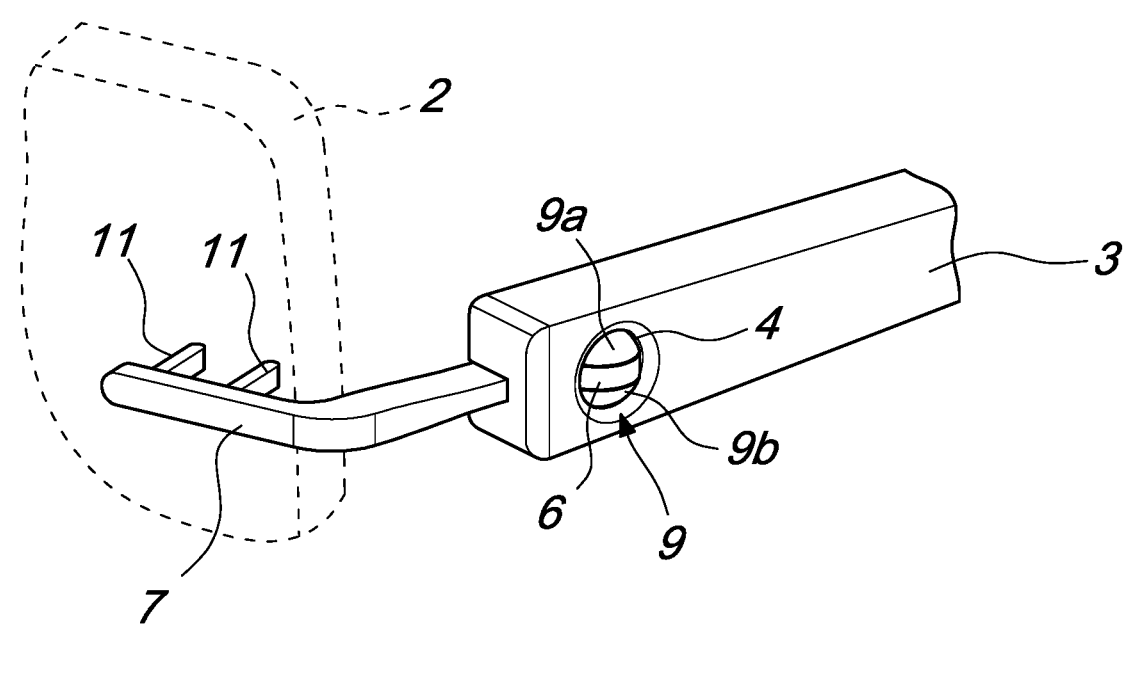
FIG. 6 is a perspective view of a further step of the coupling between the temple and the lens of the eyeglasses.
Figure 6:
Figure 7:
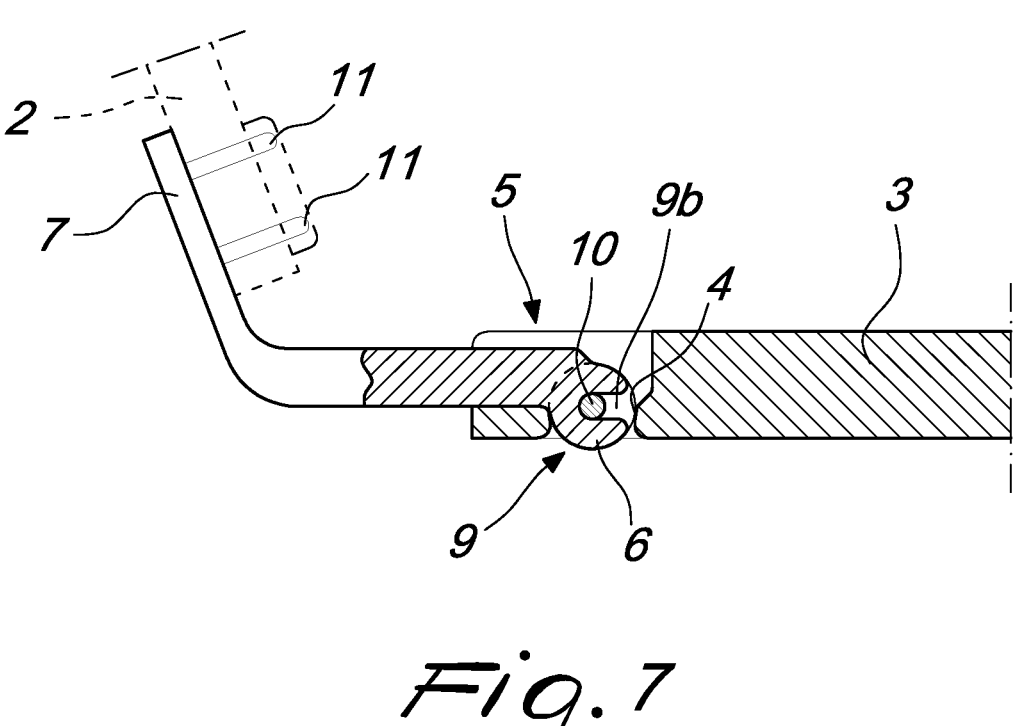
FIG. 7 is a partial sectional view of the coupling between the temple and the lens of the eyeglasses of FIG. 6.
Figure 8:
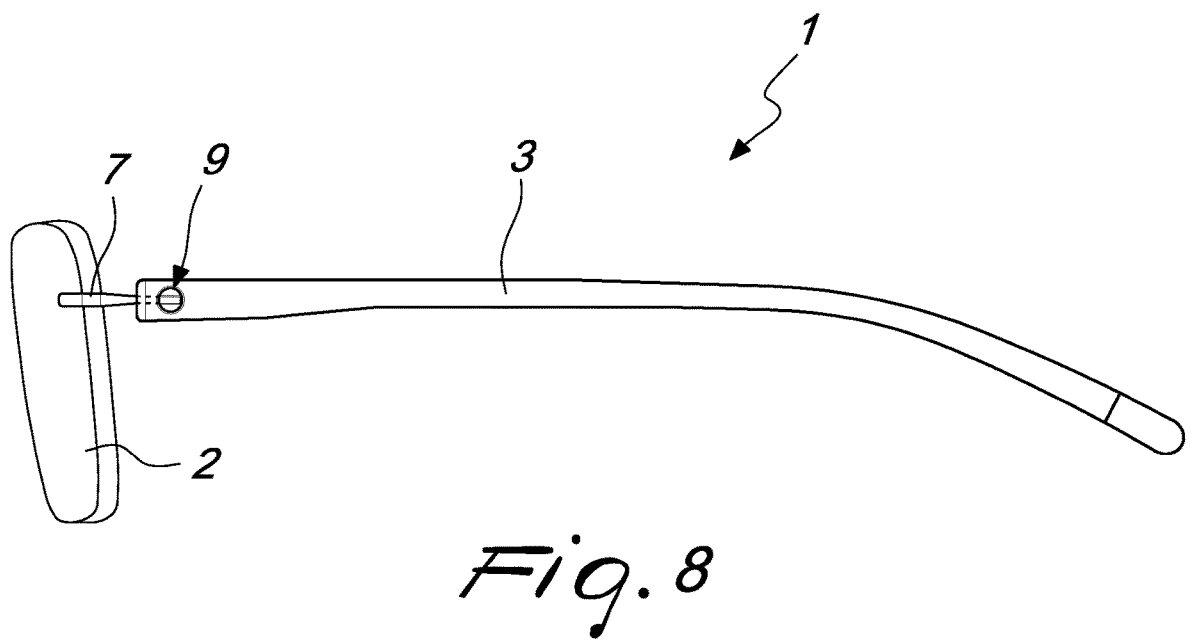
FIG. 8 is a side view of the eyeglasses according to the present disclosure.
Figure 9:
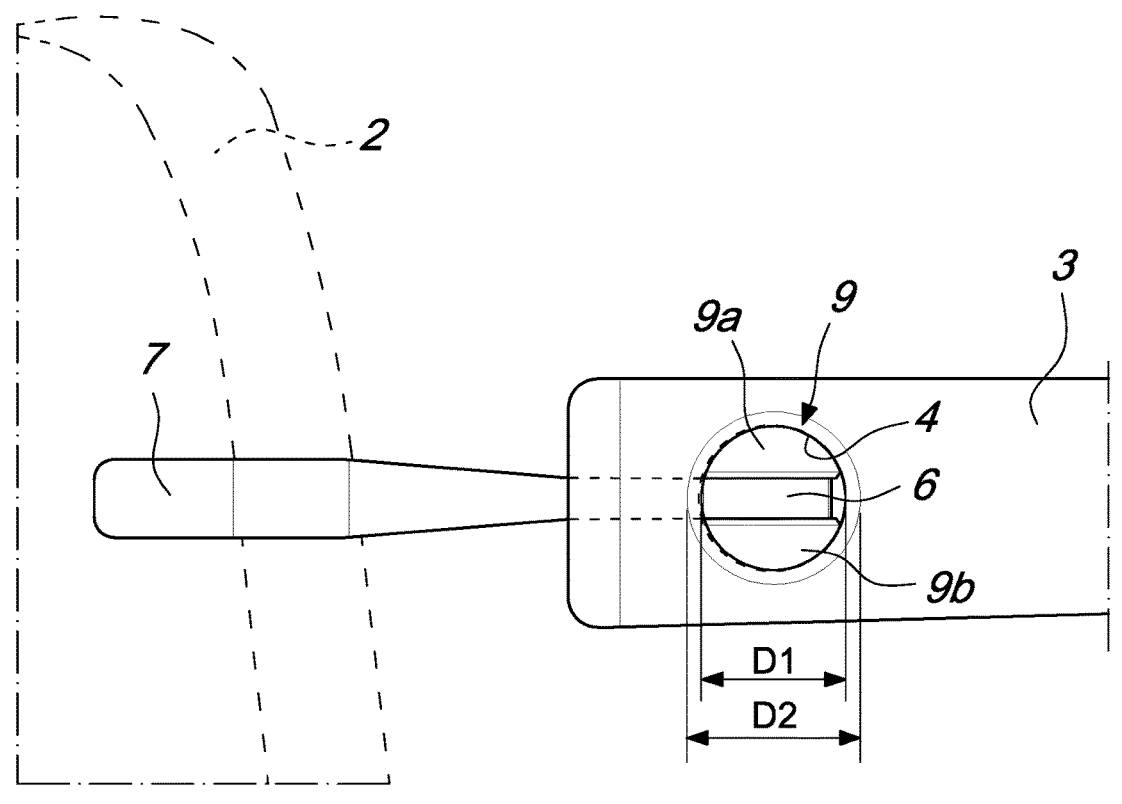
FIG. 9 is a partial side view of a detail of FIG. 8.

Once insertion has occurred, the L-shaped element 7 is retracted so that the substantially spherical element 9 is accommodated within the cavity 4 of the temple 3 in order to reach the configuration shown in FIG. 5. In this condition, the L-shaped element 7 keeps the temple 3 in a closed configuration. The open configuration of the temple 3 is instead provided by rotating the temple about the pivot 10 with respect to the substantially L-shaped element. The substantially spherical element 9 in fact engages by interference the seat 4 and therefore the temple 3 can rotate about the substantially L-shaped element 7, this rotation occurring about the pivot 10.

This configuration is shown in FIGS. 6-9.

Essentially, therefore, the eyeglasses with simplified hinge according to the disclosure have a hinge which comprises an L-shaped connecting element adapted to be coupled to a lens at one end and to a temple at the opposite end, the hinge comprising furthermore a retention and locking element which is for example substantially spherical and is coupled in a cavity of the temple, the substantially spherical element acting both as element for retention and locking of the L-shaped connecting element within the cavity formed in the temple and as fulcrum for the temple with respect to the L-shaped connecting element.

Figure 10:
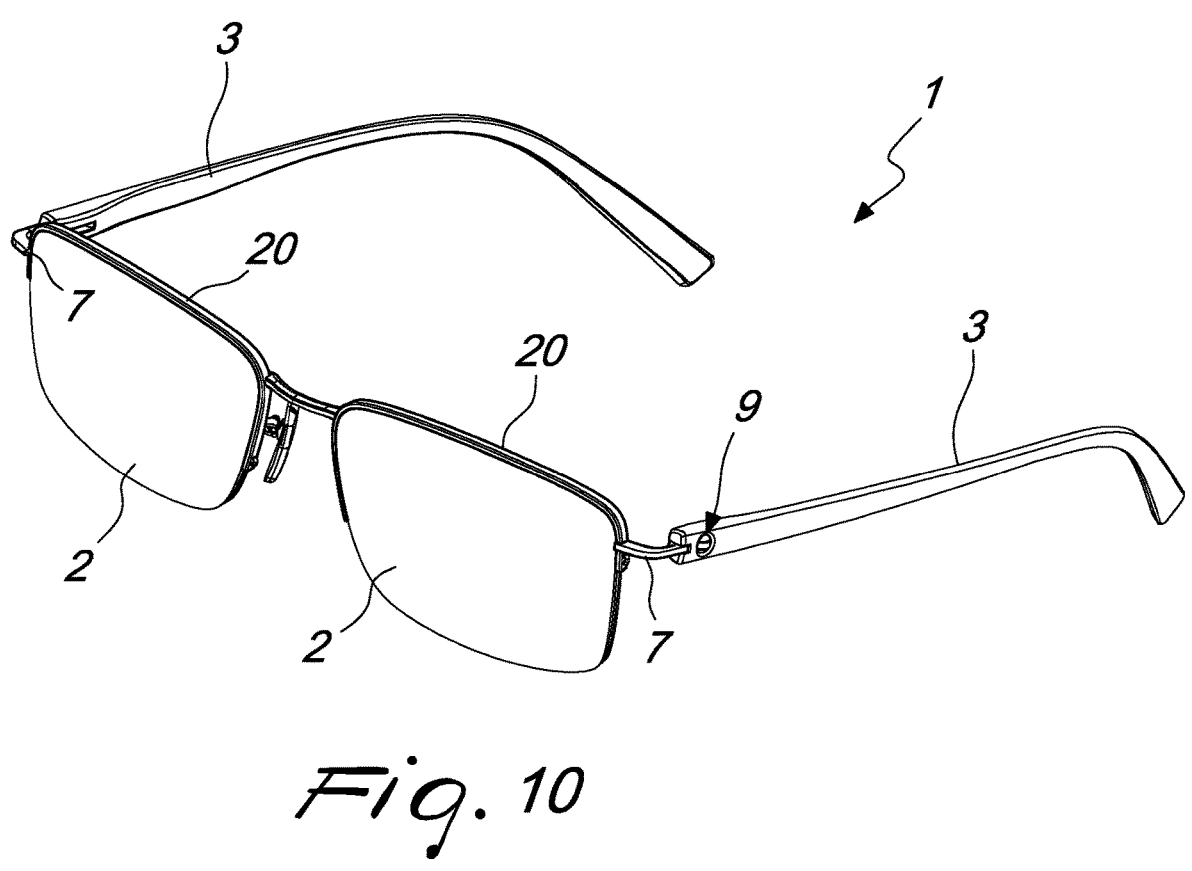
FIG. 10 is a perspective view of another embodiment of the eyeglasses according to the present disclosure.
Figure 11:
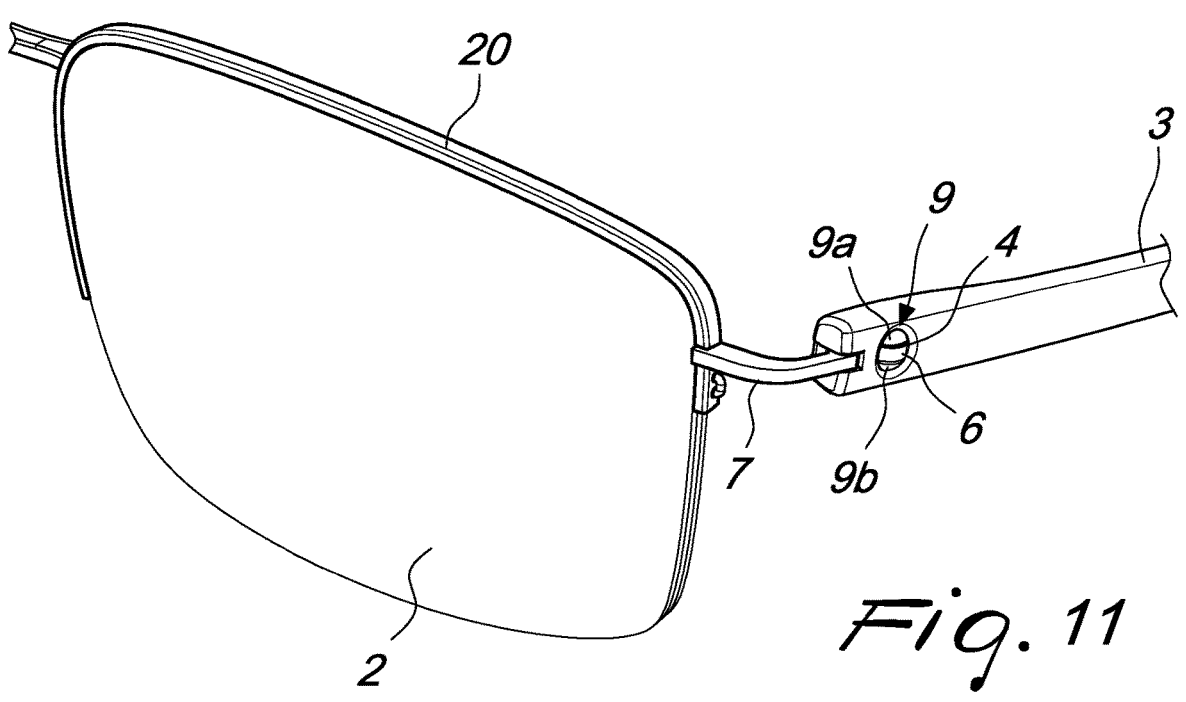
FIG. 11 is an enlarged-scale perspective view of a detail of the embodiment of FIG. 10.

In another embodiment, the connecting element 7, as shown in FIG. 10, instead of having the pivots 11 described in the preceding embodiment, is blended with a ring 20 which surrounds at least partially the lens 2 of the eyeglasses and acts as an element for the retention of said lens.

In practice it has been found that the eyeglasses according to the disclosure fully achieve the intended aim and objects, since they allow to have an extremely simplified assembly of the temple with respect to the lens, with the temple that can be assembled with respect to the lens without resorting to the aid of tools, and therefore this operation can be performed even directly by the user without therefore resorting to specialized technicians.

The eyeglasses thus conceived are susceptible of numerous modifications and variations, all of which are within the scope of the accompanying claims.

All the details may furthermore be replaced with other technically equivalent elements.

In practice, the materials used, as well as the contingent shapes and dimensions, may be any according to the requirements and the state of the art.

The disclosures in Italian Patent Application no. 102019000012243, from which this application claims priority, are incorporated herein by reference.

The invention claimed is:

1. Eyeglasses with simplified hinge, comprising a pair of lenses, a pair of temples, and a hinge for connection between each one of said temples and said lenses, wherein said hinge consists of an element for connecting the lens and the temple, adapted to be connected to the lens at one end and provided, at an opposite end, with a portion adapted to engage a substantially spherical retention and locking element, said temple being provided with a cavity adapted to allow the insertion of said connecting element and accommodate and lock said substantially spherical retention and locking element, said retention and locking element acting as a rotation fulcrum for said temple with respect to said connecting element, said temple being provided with a longitudinal seat adapted to accommodate the connecting element so that the connecting element is accommodated inside the thickness of the temple when the temple is in the open condition, wherein said portion adapted to engage said substantially spherical retention and locking element is a hook-shaped portion.

2. The eyeglasses according to claim 1, wherein said element for connecting the lens and the temple comprises a substantially L-shaped element.

3. The eyeglasses according to claim 1, wherein said element for connecting the lens and the temple is provided, at said one end, with a pair of pivots for coupling to said lens.

4. The eyeglasses according to claim 1, wherein said substantially spherical retention and locking element is composed of two hemispheres which are mutually coupled by a pivot, said pivot being adapted to engage within said hook-shaped portion of said connecting element.

5. The eyeglasses according to claim 4, wherein a diameter of said cavity is smaller than a diameter of said substantially spherical element, for an interference coupling between said substantially spherical element and said cavity.

6. The eyeglasses according to claim 1, wherein said hook-shaped portion of said connecting element is shaped so as to have a cavity with parallel faces.

7. The eyeglasses according to claim 1, wherein said connecting element, at said one end, is blended with a ring configured to surround said lens at least partially.

\* \* \* \* \*